J. W. NEWSOM.
THRESHING MACHINE.
APPLICATION FILED DEC. 17, 1912.
1,083,852.
Patented Jan. 6, 1914.
2 SHEETS—SHEET 1.
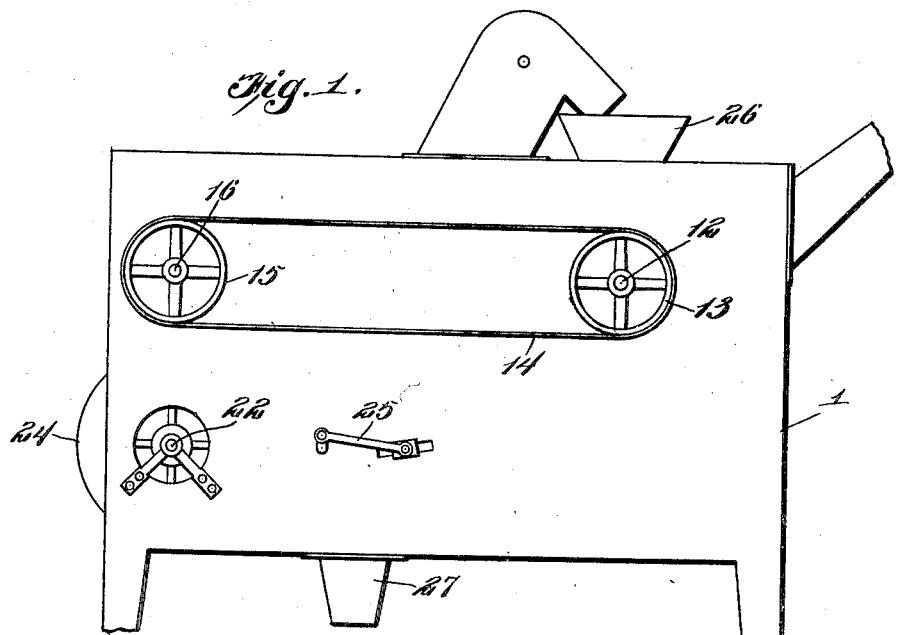
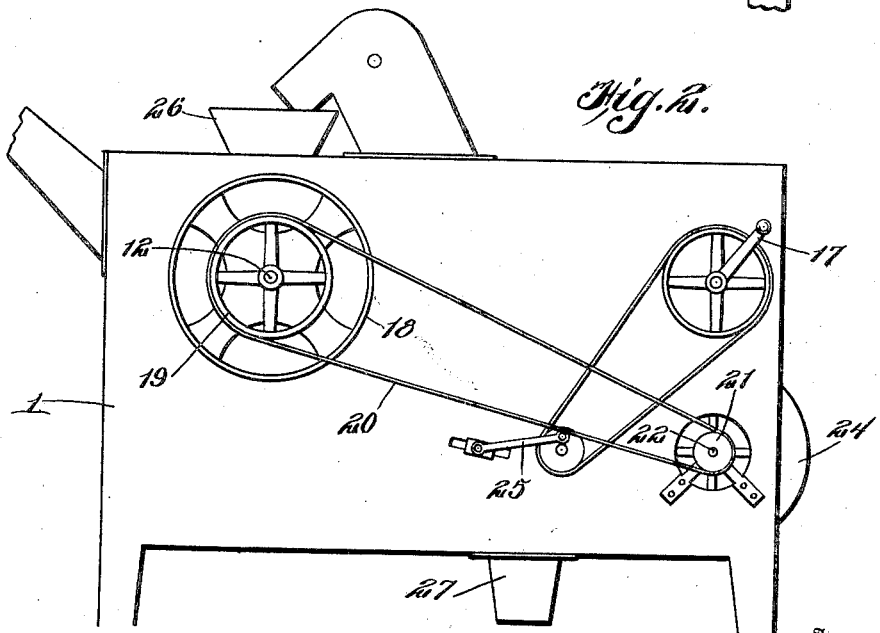
Witnesses
Louis R. Heinrichs.
R. M. Smith.
Inventor
John W. Newsom
By Victor J. Evans
Attorney

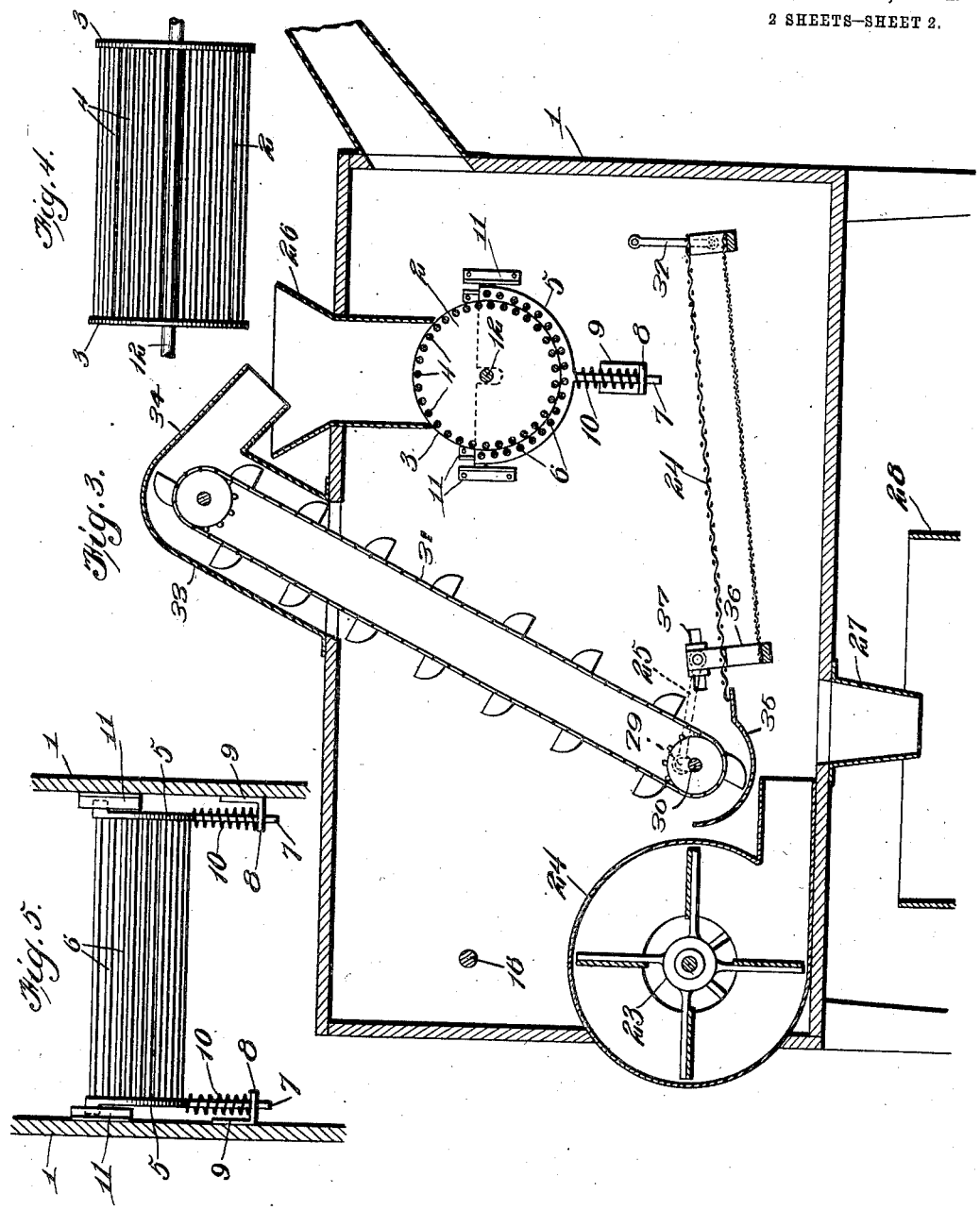

UNITED STATES PATENT OFFICE.

JOHN W. NEWSOM, OF NEWCASTLE, TEXAS.

THRESHING-MACHINE.

1,083,852. Specification of Letters Patent. Patented Jan. 6, 1914.

Application filed December 17, 1912. Serial No. 737,272.

*To all whom it may concern:*

Be it known that I, JOHN W. NEWSOM, a citizen of the United States, residing at Newcastle, in the county of Young and State of Texas, have invented new and useful Improvements in Threshing-Machines, of which the following is a specification.

This invention relates to threshing machines, the object in view being to provide a machine of the class described which is especially adapted to operate upon maize, Kafir corn, cane, and the like, so as to effectively remove or rub off the seed or grains, without crushing or breaking the same.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation of a threshing machine, embodying the present invention. Fig. 2 is a similar view taken from the opposite side. Fig. 3 is a vertical longitudinal section through the machine. Fig. 4 is a detail view of the cylinder. Fig. 5 is a similar view of the concave.

The frame 1 of the machine may be constructed in any usual or preferred manner as long as it is of sufficient size to support the operative parts of the machine hereinafter described. Within such frame or casing of the machine, there is arranged a revolving cylinder 2 which, in the preferred embodiment of the invention, comprises two disk-shaped heads 3, between which is arranged an annular series of parallel rods 4 of any desired size, and spaced at a suitable distance apart, said rods being terminally attached rigidly to the heads 3.

In connection with the cylinder, just hereinabove described, I employ a substantially semi-cylindrical concave which comprises substantially semi-circular heads 5 and parallel rods 6 terminally attached to said heads, the concave as a whole being comparatively rigid.

Extending downward from the bottom of the concave, hereinabove described, and secured to opposite ends thereof, are parallel guide rods 7 which work through openings in the inwardly extending horizontal arms 8 of a pair of brackets 9 secured to the machine frame. Encircling the guide rods 7 are coiled expansion springs 10 which are interposed between the bracket arms 8 and the bottom of the concave, as shown in Fig. 5. These springs serve to hold the concave yieldingly up under the revolving cylinder, during the operation of the latter. Arranged in front and rear of the concave and at or near the opposite ends thereof are the parallel vertical guides 11 which steady and sustain the lateral thrust of the concave and hold the same in position in the up and down sliding movement thereof, caused by the operation of the revolving cylinder 2 and the supporting or sustaining springs 10.

The cylinder 2 is mounted upon a rotary shaft 12 journaled in suitable bearings in the machine frame, and provided at one end with a band pulley 13, around which passes a belt 14 which is driven by a pulley 15 on a crank shaft 16 having at the opposite end a hand crank 17, by means of which the machine is operated.

It will, of course, be apparent that in place of the hand crank 17, a band pulley may be substituted to enable the machine to be driven by power. On the opposite end of the shaft 12 is fastened a fly wheel 18, and also another pulley 19, around which passes a belt 20 which also passes around a small band pulley 21 on a shaft 22 of a revolving fan 23, the same revolving within a suitable fan casing 24, the blast from which is directed across a riddle located under the concave.

26 designates a suitable hopper for feeding the material to the cylinder and concave, while 27 designates a delivery spout beneath which a suitable receptacle 28 may be placed for catching the seed or grain.

The inclined riddle shown at 24 is adapted to oscillate back and forth in a nearly horizontal direction and has connected thereto at opposite sides, actuating rods 25 which are journaled at their opposite ends on cranks 29 on the bottom shaft 30 of the elevator 31. At the end opposite the elevator, the riddle 24 is supported by swinging links 32. The elevator 31 extends upward into a discharge nozzle 34 overhanging the hopper 26, whereby the coarser grain which gravitates off the lower end of the inclined riddle 24 is received in a trough 35 and carried upward by the elevator and again discharged into the hopper for further action on the part of the cylinder and concave. At its lower end the riddle 24 is supported by parallel uprights 36 the upper ends of which slide back and forth in slots 37 in the machine frame, the rods 25 being connected to the upper ends of the members 36 and serving to reciprocate the lower end of the inclined riddle 24 while the opposite or higher end thereof swings or oscillates on the pivoted supporting links 32.

From the foregoing description, it will be seen that as the cylinder revolves in the concave, the material is rubbed between the parallel bars of the cylinder and concave, and the grain or seed is removed therefrom, without being crushed or broken, as the concave is spring supported, so as to yield away from the cylinder, while at the same time the springs 10 insure a sufficient rubbing action to produce the desired result. After the grains or seeds are thus removed, they gravitate through the spaces between the parallel rods 6 of the concave and fall upon the reciprocatory riddle, where they are subjected to a blast of air from the fan, thereby being cleaned before they finally pass through the riddle and are discharged through the spout 27 into a suitable receptacle 28 placed beneath the same.

What is claimed is:

In a threshing machine of the class described, a rotary threshing cylinder comprising an annular series of parallel cylindrical rods, a hopper arranged to discharge directly upon the top run of said rods, a yieldingly sustained concave arranged directly under said cylinder and embodying semi-disk-shaped heads slotted to slide by the cylinder shaft and partially house in the cylinder heads, a semi-circular series of parallel cylindrical rods fastened to the heads of the concave, sets of vertical parallel lateral thrust guides between which the concave slides, downwardly extending guide stems on the heads of the concave, and fixed guides for said stems.

In testimony whereof I affix my signature in presence of two witnesses.

JOHN W. NEWSOM.

Witnesses:
 ABE F. JONES,
 C. D. COON.